(12) United States Patent
Myers

(10) Patent No.: US 8,899,356 B2
(45) Date of Patent: Dec. 2, 2014

(54) DRILL BITS, CUTTING ELEMENTS FOR DRILL BITS, AND DRILLING APPARATUSES INCLUDING THE SAME

(75) Inventor: Russell Roy Myers, Provo, UT (US)

(73) Assignee: Dover BMCS Acquisition Corporation, Orem, UT (US)

( * ) Notice: Subject to any disclaimer, the term of this patent is extended or adjusted under 35 U.S.C. 154(b) by 848 days.

(21) Appl. No.: 12/980,217

(22) Filed: Dec. 28, 2010

(65) Prior Publication Data

US 2012/0160573 A1    Jun. 28, 2012

(51) Int. Cl.
    *E21B 10/36*       (2006.01)
    *E21D 20/00*       (2006.01)
    *E21B 10/58*       (2006.01)

(52) U.S. Cl.
    CPC ............... *E21B 10/58* (2013.01); *E21D 20/00* (2013.01)
    USPC ........... 175/428; 175/427; 175/412; 175/414; 175/415; 175/420.1; 175/426; 175/430; 175/431; 175/420.2

(58) Field of Classification Search
    CPC .......... E21B 10/55; E21B 10/58; E21D 20/00
    USPC .............. 175/427, 412, 414, 415, 420.1, 426, 175/430, 431, 420.2, 428
    See application file for complete search history.

(56) References Cited

U.S. PATENT DOCUMENTS

| | | | |
|---|---|---|---|
| 3,132,908 A | 5/1964 | Grotzinger | |
| 3,311,431 A | 3/1967 | Hilliard | |
| 3,371,970 A | 3/1968 | Beerli | |
| 3,442,342 A | 5/1969 | McElya et al. | |
| 3,542,441 A | 11/1970 | Nixon | |
| 3,625,327 A | 12/1971 | Birdsey | |
| 3,745,623 A | 7/1973 | Wentorf, Jr. et al. | |
| 3,858,668 A | 1/1975 | Bell | |
| 3,858,669 A | 1/1975 | Jeter | |
| 4,129,343 A | 12/1978 | Janssen | |
| 4,226,485 A | 10/1980 | Pruvot | |
| 4,240,683 A | 12/1980 | Crase | |
| 4,256,190 A | 3/1981 | Bodine | |

(Continued)

FOREIGN PATENT DOCUMENTS

| | | |
|---|---|---|
| DE | 4226986 A1 | 2/1994 |
| EP | 0543461 A2 | 5/1993 |
| WO | WO 80/01939 | 9/1980 |

OTHER PUBLICATIONS

Non-Final Office Action received in U.S. Appl. No. 11/212,232; Jul. 10, 2007.

(Continued)

*Primary Examiner* — Jennifer H Gay
*Assistant Examiner* — George Gray
(74) *Attorney, Agent, or Firm* — ALG Intellectual Property, LLC

(57) ABSTRACT

A roof-bolt drill bit may have a forward end, a rearward end, and a rotational axis extending between the forward end and the rearward end. A cutting element for the roof-bolt drill bit may include a cutting face and a peripheral surface extending around an outer periphery of the cutting face. The cutting element may include at least one chamfer region and a peripherally extending chamfer extending from the at least one chamfer region along the outer periphery of the cutting element, a width of the at least one chamfer region being greater than a width of the peripherally extending chamfer.

20 Claims, 9 Drawing Sheets

(56) References Cited

U.S. PATENT DOCUMENTS

| | | |
|---|---|---|
| 4,268,094 A | 5/1981 | Greene |
| 4,345,798 A | 8/1982 | Cortes |
| 4,386,666 A | 6/1983 | Crase et al. |
| 4,410,054 A | 10/1983 | Nagel et al. |
| 4,468,138 A | 8/1984 | Nagel |
| 4,506,998 A | 3/1985 | Showalter |
| 4,515,486 A | 5/1985 | Ide |
| 4,560,014 A | 12/1985 | Geczy |
| 4,604,106 A | 8/1986 | Hall et al. |
| 4,620,601 A | 11/1986 | Nagel |
| 4,629,373 A | 12/1986 | Hall |
| 4,639,146 A | 1/1987 | Yoshioka et al. |
| 4,657,090 A | 4/1987 | Geczy |
| 4,662,348 A | 5/1987 | Hall et al. |
| 4,708,496 A | 11/1987 | McPherson |
| 4,710,036 A | 12/1987 | Geczy |
| 4,720,199 A | 1/1988 | Geczy et al. |
| 4,729,440 A | 3/1988 | Hall |
| 4,732,364 A | 3/1988 | Seger et al. |
| 4,738,322 A | 4/1988 | Hall et al. |
| 4,756,631 A | 7/1988 | Jones |
| 4,764,036 A | 8/1988 | McPherson |
| 4,802,539 A | 2/1989 | Hall et al. |
| 4,818,124 A | 4/1989 | Brandenstein et al. |
| 4,997,292 A | 3/1991 | Klimkovsky et al. |
| 5,092,687 A | 3/1992 | Hall |
| 5,125,754 A | 6/1992 | Ide |
| 5,253,939 A | 10/1993 | Hall |
| 5,287,936 A | 2/1994 | Grimes et al. |
| 5,346,026 A | 9/1994 | Pessier et al. |
| 5,364,192 A | 11/1994 | Damm et al. |
| 5,368,398 A | 11/1994 | Damm et al. |
| 5,429,199 A * | 7/1995 | Sheirer et al. ............... 175/321 |
| 5,437,343 A | 8/1995 | Cooley et al. |
| 5,441,347 A | 8/1995 | Ide |
| 5,460,233 A * | 10/1995 | Meany et al. ............... 175/428 |
| 5,467,836 A | 11/1995 | Grimes et al. |
| 5,480,233 A | 1/1996 | Cunningham |
| 5,498,081 A | 3/1996 | Dennis et al. |
| 5,655,612 A | 8/1997 | Grimes et al. |
| 5,735,668 A | 4/1998 | Klein |
| 5,743,654 A | 4/1998 | Ide et al. |
| 5,795,077 A | 8/1998 | Gozdawa |
| 5,876,125 A | 3/1999 | Wyndorps et al. |
| 5,881,830 A | 3/1999 | Cooley |
| 6,000,851 A | 12/1999 | Cohen et al. |
| 6,050,354 A | 4/2000 | Pessier et al. |
| 6,091,175 A | 7/2000 | Kinsinger |
| 6,422,754 B1 | 7/2002 | Dong et al. |
| 6,424,066 B1 | 7/2002 | Watson et al. |
| 6,517,246 B2 | 2/2003 | Blakley |
| 6,793,681 B1 | 9/2004 | Pope et al. |
| D514,131 S | 1/2006 | Brady |
| 7,060,641 B2 | 6/2006 | Qian et al. |
| 7,163,368 B2 | 1/2007 | Ide et al. |
| 7,306,059 B2 | 12/2007 | Ide |
| 7,608,333 B2 | 10/2009 | Eyre |
| 7,703,982 B2 | 4/2010 | Cooley |
| 7,726,420 B2 | 6/2010 | Shen et al. |
| 7,798,257 B2 | 9/2010 | Shen et al. |
| 7,870,913 B1 | 1/2011 | Sexton et al. |
| 7,946,768 B2 | 5/2011 | Cooley et al. |
| 8,069,933 B2 | 12/2011 | Sexton et al. |
| 2004/0241021 A1 | 12/2004 | Ide et al. |
| 2005/0247486 A1 | 11/2005 | Zhang et al. |
| 2006/0278439 A1 | 12/2006 | Ide |
| 2007/0046120 A1 | 3/2007 | Cooley et al. |
| 2007/0110561 A1 | 5/2007 | Ide et al. |
| 2007/0235230 A1 | 10/2007 | Cuillier et al. |
| 2008/0115976 A1 | 5/2008 | Ide |
| 2009/0057031 A1 | 3/2009 | Patel et al. |
| 2011/0174544 A1 | 7/2011 | Scott et al. |

OTHER PUBLICATIONS

Final Office Action received in U.S. Appl. No. 11/212,232; Jan. 10, 2008.
Non-Final Office Action received in U.S. Appl. No. 11/212,232; Jun. 17, 2008.
Final Office Action received in U.S. Appl. No. 11/212,232; Dec. 4, 2008.
Non-Final Office Action received in U.S. Appl. No. 11/212,232; Mar. 16, 2009.
Final Office Action received in U.S. Appl. No. 11/212,232; Jul. 31, 2009.
Non-Final Office Action received in U.S. Appl. No. 11/879,867; Dec. 1, 2009.
Final Office Action received in U.S. Appl. No. 11/879,867; May 18, 2010.
U.S. Appl. No. 11/879,867, filed Jul. 18, 2007, Sexton et al.
U.S. Appl. No. 12/761,535, filed Apr. 16, 2010, Scott et al.
International Search Report dated Dec. 19, 2006, for International Application No. PCT/US2006/033201 (2 pages).
Restriction Requirement received in U.S. Appl. No. 11/212,232; Apr. 13, 2007.
Search Report and Written Opinion received in related International Application No. PCT/US11/066314 on Apr. 13, 2012.

* cited by examiner

DRILL BITS, CUTTING ELEMENTS FOR DRILL BITS, AND DRILLING APPARATUSES INCLUDING THE SAME

BACKGROUND

Cutting elements are traditionally utilized for a variety of material removal processes, such as machining, cutting, and drilling. For example, tungsten carbide cutting elements have been used for machining metals and on drilling tools for drilling subterranean formations. Similarly, polycrystalline diamond compact (PDC) cutters have been used to machine metals (e.g., non-ferrous metals) and on subterranean drilling tools, such as drill bits, reamers, core bits, and other drilling tools.

Drill bit bodies to which cutting elements are attached are often formed of steel or of molded tungsten carbide. Drill bit bodies formed of molded tungsten carbide (so-called matrix-type bit bodies) are typically fabricated by preparing a mold that embodies the inverse of the desired topographic features of the drill bit body to be formed. Tungsten carbide particles are then placed into the mold and a binder material, such as a metal including copper and tin, is melted or infiltrated into the tungsten carbide particles and solidified to form the drill bit body. Steel drill bit bodies, on the other hand, are typically fabricated by machining a piece of steel to form the desired external topographic features of the drill bit body. Steel drill bit bodies may also be fabricated by casting or forging a steel part and then machining the part to have the desired topographic features.

In some situations, drill bits employing cutting elements may be used in subterranean mining to drill roof-support holes. For example, in underground mining operations, such as coal mining, tunnels must be formed underground. In order to make certain tunnels safe for use, the roofs of the tunnels must be supported in order to reduce the chances of a roof cave-in and/or to block various debris falling from the roof. In order to support a roof in a mine tunnel, boreholes are typically drilled into the roof using a drilling apparatus. The drilling apparatus typically includes a drill bit attached to a drilling rod (commonly referred to as a "drill steel"). Roof bolts are then inserted into the boreholes to support the roof and/or to anchor a support panel to the roof. The drilled boreholes may be filled with a hardenable resin prior to inserting the bolts, or the bolts may have self expanding portions, in order to anchor the bolts to the roof.

Various types of cutting elements, such as PDC cutters, have been employed for drilling boreholes for roof bolts. Although other configurations are known in the art, PDC cutters often comprise a substantially cylindrical or semi-cylindrical diamond "table" formed on and bonded under high-pressure and high-temperature (HPHT) conditions to a supporting substrate, such as a cemented tungsten carbide (WC) substrate. A cutting edge, such as a chamfered cutting edge, may be formed on the diamond table. The cutting edge may be exposed to various stresses as the cutting edge is forced against a subterranean formation that is being drilled. However, the PDC cutters may experience spalling, chipping, and/or partial fracturing during use.

SUMMARY

The instant disclosure is directed to exemplary cutting elements for roof-bolt drill bits. In some embodiments, a roof-bolt drill bit may have a forward end, a rearward end, and a rotational axis extending between the forward end and the rearward end. A cutting element for the roof-bolt drill bit may comprise a cutting face and a peripheral surface extending around an outer periphery of the cutting face. In some embodiments, the periphery may be non-cylindrical. In additional embodiments, the periphery may be substantially cylindrical. At least one chamfer region may be located on the cutting element and a peripherally extending chamfer may extend from the at least one chamfer region along the outer periphery of the cutting face.

In at least one embodiment, a width of the at least one chamfer region of the cutting element may be greater than a width of the peripherally extending chamfer. For example, the width of the at least one chamfer region may be greater than twice the width of the peripherally extending chamfer. According to some embodiments, the at least one chamfer region and the peripherally extending chamfer may be defined by a first edge adjacent the cutting face and a second edge adjacent the peripheral surface. A width of the at least one chamfer region between the first edge and the second edge may be greater than a width of the peripherally extending chamfer between the first edge and the second edge. In one embodiment, the peripherally extending chamfer may exhibit a greater angle relative to the cutting face than the at least one chamfer region. In at least one embodiment, the at least one chamfer region may exhibit a greater depth than the peripherally extending chamfer.

According to various embodiments, the cutting element may further comprise a superabrasive table (e.g., a polycrystalline diamond table) bonded to a substrate. In various embodiments, the peripheral surface of the cutting element may comprise an arcuate surface, such as a partial-cylindrical surface.

In at least one embodiment, the at least one chamfer region may comprise a first chamfer region and a second chamfer region on a portion of the cutting element opposite the first chamfer region. The peripherally extending chamfer may extend from the first chamfer region to the second chamfer region. The cutting element may comprise a substantially symmetrical periphery about a plane extending through the cutting element. In at least one embodiment, the first chamfer region may comprise substantially the same shape as the second chamfer region. In various embodiments, the cutting element may comprise a plurality of chamfer regions, the plurality of chamfer regions including the at least one chamfer region.

The at least one cutting element may positioned on a roof-bolt drill bit with a back rake angle of between approximately 5° and approximately 45° and a side rake angle of between approximately 0° and approximately 20°. In at least one embodiment, the roof-bolt drill bit may comprise two cutting elements positioned circumferentially substantially 180° apart with substantially the same back rake angles and side rake angles. According to some embodiments, a roof-bolt drilling apparatus may comprise a drill steel and a drill bit mounted to the drill steel, the drill bit comprising the cutting element.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification.

Figure 1:
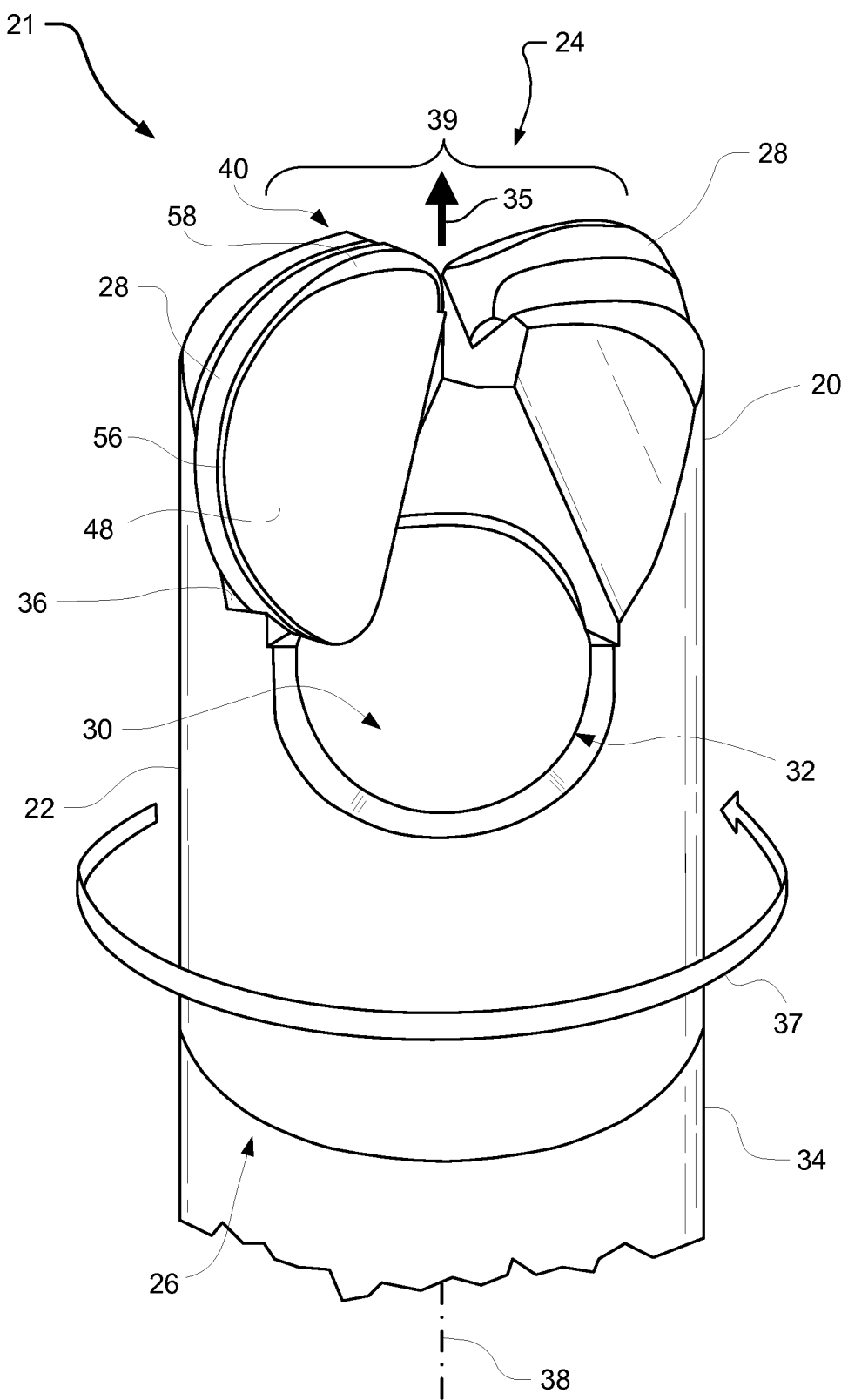
FIG. 1 is a perspective view of a portion of an exemplary drilling apparatus according to at least one embodiment.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The instant disclosure is directed to exemplary drill bits, cutting elements for drill bits, and drilling apparatus for drilling formations in various environments. In at least one embodiment, a drill bit, such as a roof-bolt drill bit, may be coupled to a drill steel and rotated by a drilling apparatus configured to rotate the drill bit relative to a subterranean formation. Cutting elements for cutting the subterranean formation may be mounted to a bit body of the drill bit. For ease of use, the word "cutting," as used in this specification and claims, refers broadly to machining processes, drilling processes, boring processes, or any other material removal process.

FIG. 1 is a perspective view of a portion of an exemplary drilling apparatus 21 according to at least one embodiment. Drilling apparatus 21 may comprise a drill bit 20 coupled to a drill steel 34. Drill bit 20 may represent any type or form of earth-boring or drilling tool, including, for example, a roof-bolt drill bit. Drill bit 20 may be formed of any material or combination of materials, such as steel or molded tungsten carbide, without limitation.

As illustrated FIG. 1, drill bit 20 may comprise a bit body 22 having a forward end 24, a rearward end 26, and a rotational axis 38. At least one cutting element 28 may be coupled to bit body 22. For example, as shown in FIG. 1, a plurality of cutting elements 28 may be coupled to forward end 24 of bit body 22. According to at least one embodiment, forward portions 40 of cutting elements 28 may extend from bit body 22 in axially forward direction 35 along rotational axis 38. In at least one embodiment, forward portions 40 of cutting elements 28 may form a cutting tip extending from forward end 24 of bit body 22 in axially forward direction 35. Cutting elements 28 may be coupled to bit body 22 using any suitable technique, including, for example, brazing or welding. According to some embodiments, back surfaces of cutting elements 28 (such as back surface 54 shown in FIG. 2) may be mounted and secured to mounting surfaces on bit body 22, such as mounting surface 36 shown in FIG. 1. In at least one embodiment, two cutting elements 28 may be positioned on bit body 22 circumferentially substantially 180° apart with substantially the same back rake angles and substantially the same side rake angles. According to some embodiments, the at least one cutting element may be positioned with a back rake angle of between approximately 5° and approximately 45° and a side rake angle of between approximately 0° and approximately 20°

In at least one embodiment, an internal passage 30 may be defined within bit body 22. Internal passage 30 may extend from a rearward opening defined in rearward end 26 of bit body 22 to at least one debris opening 32 defined in a side portion of bit body 22. In some embodiments, drill bit 20 may be configured for use in dry-drilling environments where cutting debris is removed from a borehole by applying a vacuum to internal passage 30. A vacuum applied to vacuum hole 30 may generate suction near debris opening 32, thereby drawing cutting debris away from the borehole and through opening 32. A vacuum applied to vacuum hole 30 may also facilitate cooling of cutting elements 28 and/or other portions of drill bit 20 through convective heat transfer as air and debris are drawn over and around cutting elements 28. In at least one embodiment, one debris opening 32 may be defined in bit body 22 for each cutting element 28. For example, two debris openings 32 may be defined in bit body 22, with the two debris openings 32 corresponding to the two respective cutting elements 28 illustrated in FIG. 1.

In various embodiments, bit body 22 may not include a debris opening for removing cutting debris. For example, drill bit 20 may be configured for use in wet-drilling environments where drilling fluids, such as drilling mud or water, are used to cool drill bit 20 and flush debris away from drill bit 20 and out of a borehole during drilling. In at least one example, ports for dispensing drilling fluids into the borehole may be defined in forward and/or side portions of bit body 22. Drilling fluids may be conveyed to such ports through one or more internal passages extending through bit body 22 and/or drill steel 34.

In some embodiments, drill bit 20 may be configured to be rotated about rotational axis 38. For example, as shown in FIG. 1, drill bit 20 may be configured to be rotated about rotational axis 38 in rotational direction 37. Drill bit 20 may be rotated using a suitable attachment connected to rearward end 26 of bit body 22. For example, drill steel 34 may rotate drill bit 20 in rotational direction 37 during drilling of a borehole. As shown in FIG. 1, rearward end 26 of drill bit 20 may be coupled to drill steel 34 by, for example, a threaded connection, a pin connection, and/or other suitable coupling. Drill steel 34 may comprise any suitable type of drilling rod or other suitable connection member configured to connect drill bit 20 to a drilling apparatus, without limitation. In some examples, drill steel 34 may comprise a substantially elongated shaft (e.g., a cylindrical shaft) having coupling surfaces corresponding to surfaces defined within drill bit 20. For example, drill steel 34 may comprise a hexagonal and/or threaded periphery corresponding to a hexagonal and/or threaded interior surface defined within drill bit 20. In some examples, drill steel 34 may comprise a pin connector corresponding to a pin hole and/or a recess defined within drill bit 20.

According to at least one embodiment, forces and/or torque may be applied by a drilling motor to drill bit 20 via drill steel 34, causing drill bit 20 to be forced against a subterranean formation in both rotational direction 37 and forward direction 35. As drill bit 20 is forced against a subterranean formation and rotated in rotational direction 37, cutting elements 28 may contact and cut into the subterranean formation, removing rock material from the formation in the form of rock cuttings and/or other debris. In at least one embodiment, cutting debris removed by cutting elements 28 may be drawn through internal passage 30 defined in bit body 22 by a vacuum applied to drill bit 20. According to some embodiments, drill steel 34 may comprise a hollow rod and a vacuum may be applied to a rearward end of drill steel 34 by a vacuum source. Cutting debris may be drawn by the vacuum through drill bit 20 and drill steel 34 toward the vacuum source.

Figure 2:
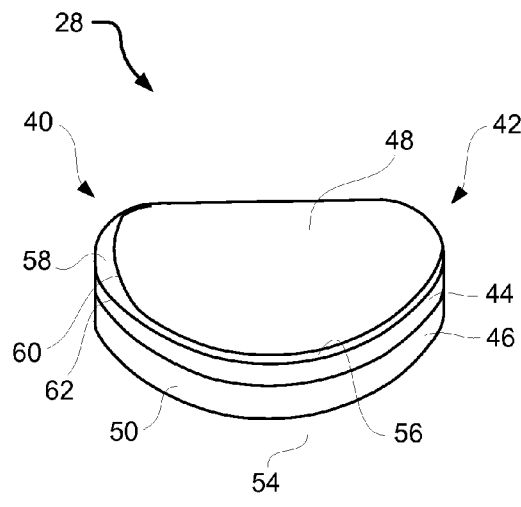
FIG. 2 is a perspective view of an exemplary cutting element according to at least one embodiment.
Figure 3:
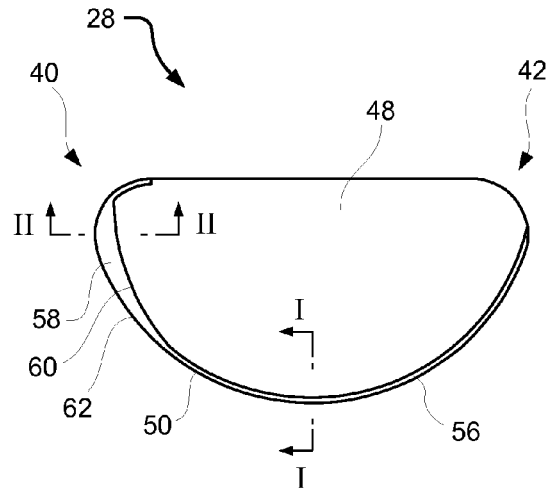
FIG. 3 is a top view of the exemplary cutting element illustrated in FIG. 3.

FIG. 2-8 illustrate exemplary cutting elements 28 that may be coupled to exemplary bit body 22 in FIG. 1. FIG. 2 is a perspective view of a cutting element 28 and FIG. 3 is a top view of cutting element 28. As illustrated in FIG. 2, cutting element 28 may comprise a layer or table 44 affixed to or formed upon a substrate 46. Table 44 may be formed of any material or combination of materials suitable for cutting subterranean formations, including, for example, a superhard or superabrasive material such as polycrystalline diamond (PCD). The word "superhard," as used herein, refers to any material having a hardness that is at least equal to a hardness of tungsten carbide. Similarly, substrate 46 may comprise any material or combination of materials capable of adequately supporting a superabrasive material during drilling of a subterranean formation, including, for example, cemented tungsten carbide.

In at least one embodiment, cutting element 28 may comprise a table 44 comprising polycrystalline diamond bonded to a substrate 46 comprising cobalt-cemented tungsten carbide. In at least one embodiment, after forming table 44, a catalyst material (e.g., cobalt or nickel) may be at least partially removed from table 44. A catalyst material may be removed from at least a portion of table 44 using any suitable technique, such as, for example, acid leaching. According to some embodiments, table 44 may formed to a thickness of at least about 0.030 inches. For example, table 44 may have a thickness of between about 0.030 inches and about 0.120 inches. In additional embodiments, table 44 may have a thickness less than 0.030 inches.

As shown in FIG. 2, cutting element 28 may also comprise a cutting face 48 formed by table 44, a peripheral surface 50 formed by table 44 and substrate 46, and a back surface 54 formed by substrate 46. According to various embodiments, cutting face 48 may be substantially planar and peripheral surface 50 may comprise a partial-cylindrical and/or otherwise arcuate surface that is optionally perpendicular to cutting face 48. Back surface 54 may be, in some embodiments, substantially parallel to cutting face 48. Cutting face 48 and peripheral surface 50 may be formed in any suitable shape, without limitation. In at least one embodiment, cutting face 48 may have a substantially arcuate periphery. In some embodiments, as illustrated in FIGS. 2 and 3, cutting face 48 may have a substantially semi-circular or partial-circular periphery having one or more rounded corner portions. As illustrated in FIGS. 1-3, cutting element 28 may include a forward portion 40 that is configured to extend from bit body 22 of drill bit 20 in forward direction 35. Cutting element 28 may also include a rearward portion 42 located opposite forward portion 40.

According to various embodiments, cutting element 28 may comprise a peripherally extending chamfer 56 formed along at least a portion of a periphery of table 44 between cutting face 48 and peripheral surface 50, as illustrated in FIGS. 1-3. Additionally, cutting element 28 may comprise a chamfer region 58 located on forward portion 40 of cutting element 28. As shown in FIGS. 1-3, peripherally extending chamfer 56 may extend from chamfer region 58 toward rearward portion 42 of cutting element 28. According to at least one embodiment, at least portions of peripherally extending chamfer 56 and/or chamfer region 58 may comprise a substantially planar surface extending between cutting face 48 and peripheral surface 50. Table 44 may also include any other suitable surface shape extending between cutting face 48 and peripheral surface 50, including, without limitation, an arcuate surface, a radius, a sharp edge, and/or a honed edge. Chamfer 56 may be configured to contact and/or cut a solid material, such as a subterranean formation, as drill bit 20 is rotated and forced against the solid material. As used herein, the phrase "cutting edge" or its variants refers to an edge portion of cutting element 28 that is exposed to and/or in contact with a formation or material being cut during drilling as drill bit 20 is directed in forward direction 35 and rotated about rotational axis 38 in rotational direction 37. In some embodiments, cutting element 28 may comprise one or more cutting edges, such as a portion of first edge 60 and/or a portion of second edge 62. First edge 60 and/or second edge 62 may define at least a portion of peripherally extending chamfer 56 and/or chamfer region 58 and may be configured to be exposed to and/or in contact with a material being cut during drilling.

Figure 4:
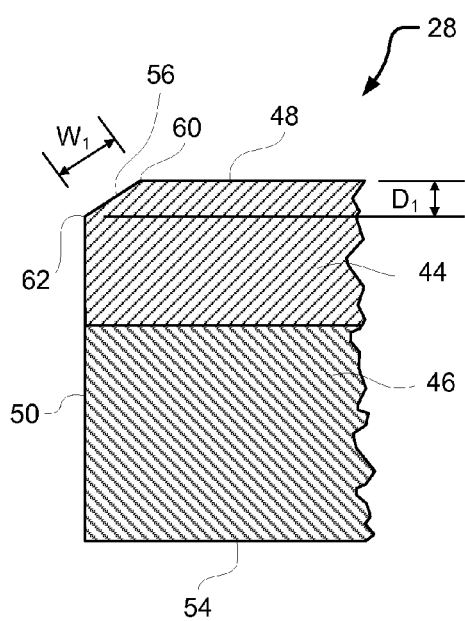
FIG. 4 is a partial cross-sectional view of the exemplary cutting element illustrated in FIG. 3.
Figure 5:
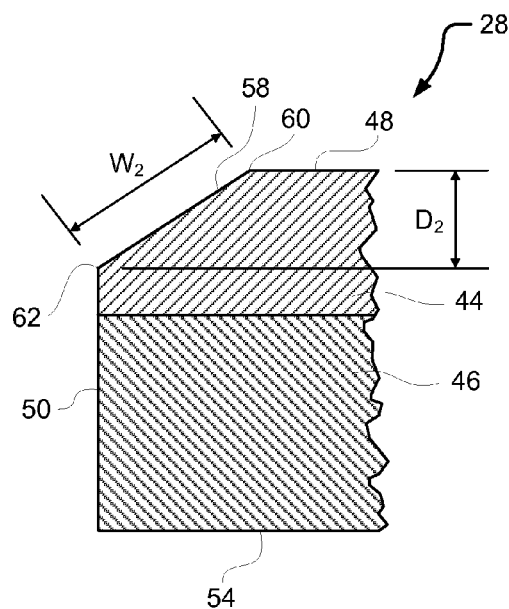
FIG. 5 is a partial cross-sectional view of the exemplary cutting element illustrated in FIG. 3.

FIG. 4 is a partial cross-sectional view of a portion of cutting element 28 taken along line I-I shown in FIG. 3. FIG. 4 shows a portion of cutting element 28 that includes peripherally extending chamfer 56. FIG. 5 is a partial cross-sectional view of a portion of cutting element 28 taken along line II-II shown in FIG. 3. FIG. 5 shows a portion of cutting element 28 that includes chamfer region 58 located on forward portion 40 of cutting element 28. As illustrated in FIGS. 4 and 5, chamfer region 58 may have a greater width $W_2$ than width $W_1$ of peripherally extending chamfer 56 as measured between first edge 60 and second edge 62. As used herein, the term "width" used in reference to a chamfer or chamfer region refers to the shortest distance between two edges defining the chamfer or chamfer region measured at a selected location on the chamfer or chamfer region. For example, a width of a portion of peripherally extending chamfer 56 and/or chamfer region 58 as measured between first edge 60 and second edge 62 may comprise the shortest distance between first edge 60 and second edge 62 extending through a selected location on peripherally extending chamfer 56 and/or chamfer region 58.

The width $W_2$ of the portion of chamfer region 58 shown in FIG. 5 may be greater than the width $W_1$ of the portion of peripherally extending chamfer 56 shown in FIG. 4. In at least one embodiment, a width $W_2$ of chamfer region 58 on forward portion 40 may be greater than twice the width $W_1$ of peripherally extending chamfer 56. For example, a width $W_2$ of chamfer region 58 may be greater than twice a maximum width $W_1$ of peripherally extending chamfer 56.

According to some embodiments, widths along peripherally extending chamfer 56 may be substantially the same. For example, peripherally extending chamfer 56 may have a substantially constant width between first edge 60 and second edge 62 along the length of peripherally extending chamfer 56 from chamfer region 58 to rearward end 42. According to additional embodiments, peripherally extending chamfer 56 may vary in width at various locations along its length, without limitation. In at least one embodiment, chamfer region 58 may vary in width at different locations along its length. For example, as illustrated in FIGS. 2 and 3, chamfer region 58 may vary in width as it extends from peripherally extending chamfer 56. According to some embodiments, chamfer region 58 may increase in width as it extends from peripherally extending chamfer 56. In one embodiment, chamfer region 58 may increase in width to a maximum, and then may decrease in width as it extends from peripherally extending chamfer 56. According to additional embodiments, chamfer region 58 may be substantially constant in width as it extends from peripherally extending chamfer 56.

The widths of peripherally extending chamfer 56 and chamfer region 58 may be selected so as to optimize the cutting performance and/or structural stability of cutting elements 28. In at least one embodiment, the smaller width of peripherally extending chamfer 56 may optimize the cutting efficiency of cutting element 28. For example, peripherally extending chamfer 56 may be oriented on a drill bit (e.g., drill bit 20 illustrated in FIG. 1) so that at least a portion of peripherally extending chamfer 56 is in contact with a subterranean formation being drilled for a selected revolutions per minute (RPM) and rate of penetration (ROP). The smaller width of peripherally extending chamfer 56 may facilitate aggressive removal of a solid material, such as rock material, leading to increased drilling efficiency and rate of penetration of cutting element 28. The larger width of chamfer region 58 may increase the durability of cutting element 28, thereby preventing spalling, chipping, and/or partial fracturing of forward end 40 during drilling.

Chamfer regions 58 of cutting elements 28 may be oriented so that at least a portion of each chamfer region 58 is in contact with a subterranean formation being drilled for a selected RPM and ROP. According to at least one example, forward ends 40 of cutting elements 28 may experience significant stresses in comparison to other portions of cutting elements 28 due to the significant thrust and tensile loads applied to forward ends 40. For example, during drilling, drill bit 20 may be forced against a subterranean formation in forward direction 35. Accordingly, forward ends 40 of cutting elements 28 mounted to bit body 22 may be subjected to greater stresses than other portions of cutting elements 28, and chamfer regions 58 on forward ends 40 of cutting elements 28 may be subjected to greater stresses than peripherally extending chamfers 56.

According to some embodiments, forward ends 40 of cutting elements 28 may be subjected to greater stresses due to the locations of forward ends 40 to a rotational axis 38 of drill bit 20 during drilling. For example, forward ends 40 of cutting elements 20 may form at least a portion of cutting tip 39 centered about rotational axis 38. Forward ends 40 may be disposed in closer proximity to rotational axis 38 than other portions of cutting elements 28 that are in contact with a subterranean formation during drilling. Because forward ends 40 are positioned closer to rotational axis 38 than other portions of cutting elements 28, forward ends 40 may travel shorter distances per revolution of drill bit 20 than other portions of cutting elements 28 that are located a greater distance from rotational axis 38. Accordingly, chamfer regions 58 on forward ends 40 of cutting elements 28 may travel shorter distances per revolution of drill bit 20 than portions of peripherally extending chamfers 56 that are in contact with a subterranean formation during drilling as drill bit 20 is directed in forward direction 35 and rotated about rotational axis 38 in rotational direction 37. Because the distances traveled by forward ends 40 are less than the distances traveled by the portions of peripherally extending chamfers 56 at an effective "depth of cut" (i.e., the distance the cutting edge is buried into the formation being drilled), a greater amount of force may be built up in chamfer regions 58 of cutting elements 28 in comparison with peripherally extending chamfers 56.

The greater width of chamfer region 58 on forward end 40 of each cutting element 28 may enable distribution of the higher stresses over a greater surface area in comparison with peripherally extending chamfer 56. Accordingly, chamfer region 58 may prevent spalling, chipping, and/or partial fracturing of cutting element 28 due to the pressure of excessive stresses in forward end 40. According to at least one embodiment, chamfer region 58 may vary along its length from greater widths at more forward locations to lesser widths at more rearward locations. For example, as illustrated in FIGS. 1-3, chamfer region 58 may narrow from a greater width at a forward location to approximately the same width as peripherally extending chamfer 56 at a region adjacent to peripherally extending chamfer 56. Accordingly, chamfer region 58 may provide the greatest surface area at a forwardmost region of cutting element 28 and may provide decreased surface areas at regions of cutting element 28 that are located rearward therefrom. Accordingly, chamfer region 58 may provide a greater amount of structural stability at the forward region and may provide increasing cutting efficiency as chamfer region 58 narrows between the forward region and peripherally extending chamfer 56.

Peripherally extending chamfer 56 and/or chamfer region 58 may be formed by any suitable process, such as grinding, lapping, and/or machining (e.g., electro-discharge machining "EDM"), without limitation. For example, peripherally extending chamfer 56 and/or chamfer region 58 may be formed by grinding cutting element 28 along an oblique path with respect to cutting face 48 and/or peripheral surface 50 of cutting element 28. In some embodiments, peripherally extending chamfer 56 and/or chamfer region 58 may also be formed by molding such features on cutting element 28 during an HPHT sintering process used to form cutting element 28.

Peripherally extending chamfer 56 and chamfer region 58 may be formed to different geometries using any suitable technique. For example, the depth and/or angle of peripherally extending chamfer 56 and/or chamfer region 58 may be selected so as to obtain a desired geometry. In at least one example, as illustrated in FIGS. 4 and 5, the depth $D_1$ or $D_2$ of peripherally extending chamfer 56 and/or chamfer region 58 with respect to cutting face 48 and/or peripheral surface 50 may be selected so as to obtain a desired width and angle for peripherally extending chamfer 56 and chamfer region 58. For example, as shown in FIG. 4, peripherally extending chamfer 56 may be formed so that second edge 62 defining a portion of peripherally extending chamfer 56 is located at a depth $D_1$ with respect to cutting face 48. Accordingly, peripherally extending chamfer 56 may have a width $W_1$ as measured between first edge 60 and the second edge 62. Additionally, as shown in FIG. 5, chamfer region 58 may be formed so that second edge 62 defining chamfer region 58 is located at a depth $D_2$ with respect to cutting face 48. Depth $D_2$ may be greater than depth $D_1$. Accordingly, a width $W_2$ of chamfer region 58, as measured between first edge 60 and the second edge 62, may be greater than the width $W_1$ of peripherally extending chamfer 56.

Figure 6:
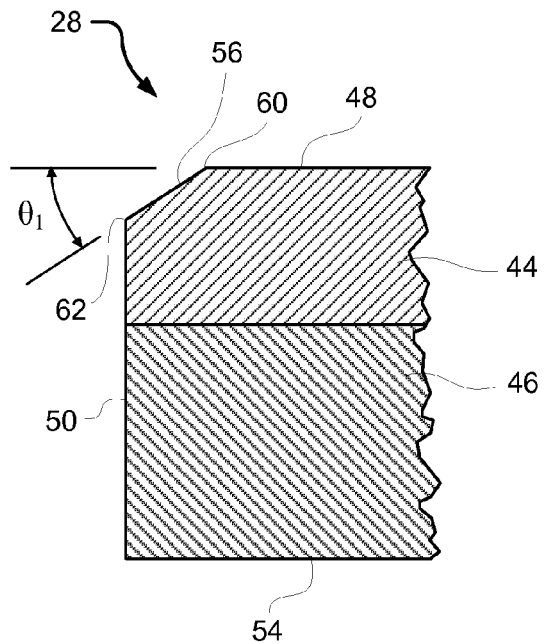
FIG. 6 is a partial cross-sectional view of an exemplary cutting element according to at least one embodiment.
Figure 7:
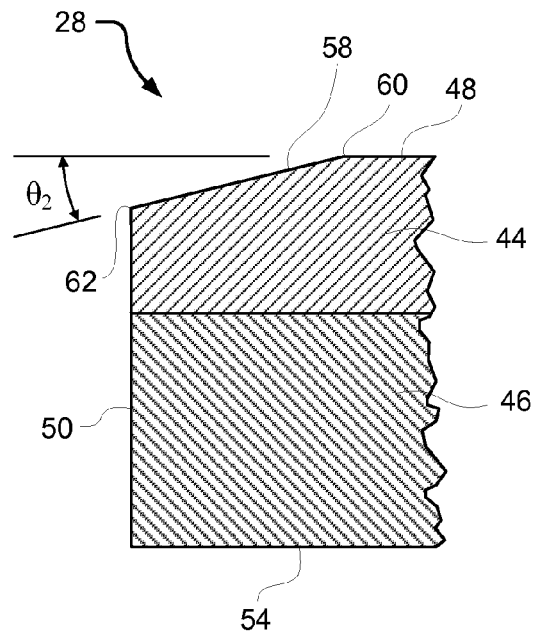
FIG. 7 is a partial cross-sectional view of an exemplary cutting element according to at least one embodiment.

According to some embodiments, as illustrated in FIGS. 6 and 7, the angle of peripherally extending chamfer 56 and/or chamfer region 58 with respect to cutting face 48 and/or peripheral surface 50 may be selected so as to obtain a desired width for peripherally extending chamfer 56 and/or chamfer region 58. For example, as shown in FIG. 6, peripherally extending chamfer 56 may be formed at an angle $\theta_1$ with respect to cutting face 48. Accordingly, peripherally extending chamfer 56 may have a first width (e.g., width $W_1$ illustrated in FIG. 4) as measured between first edge 60 and the second edge 62. As shown in FIG. 7, chamfer region 58 may be formed at an angle $\theta_2$ that is less than angle $\theta_1$ with respect to cutting face 48. In at least one embodiment, a second width (e.g., width $W_2$ illustrated in FIG. 5) of chamfer region 58, as measured between first edge 60 and second edge 62, may be greater than the first width of peripherally extending chamfer 56, such as, for example, when angle $\theta_2$ is less than angle $\theta_1$ with respect to cutting face 48 and portions of second edge 62 adjacent the first width are located at substantially the same depth with respect to cutting face 48 as portions of second edge 62 adjacent the second width. In other embodiments, angle $\theta_2$ may be greater than or equal to angle $\theta_1$. More generally, angles $\theta_1$ and $\theta_2$, as well as widths $W_1$ and $W_2$ and depths $D_1$ and $D_2$ may be selected as desired.

Figure 8:
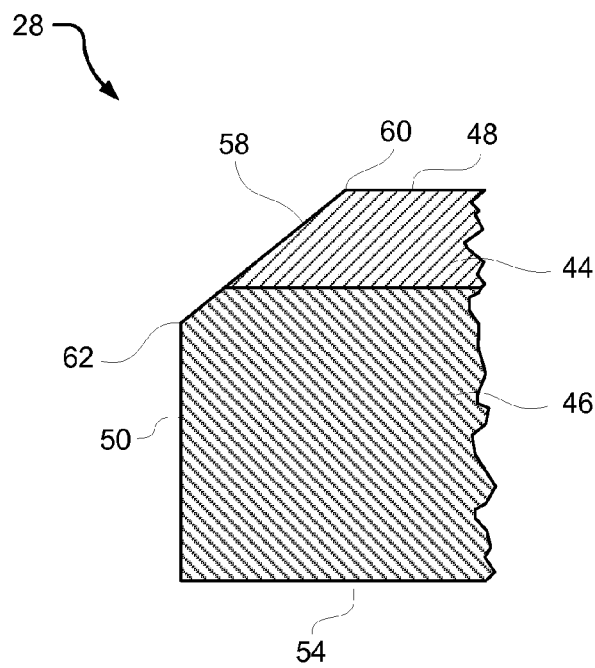
FIG. 8 is a partial cross-sectional view of an exemplary cutting element according to at least one embodiment.

According to at least one embodiment, peripherally extending chamfer 56 and/or chamfer region 58 may be formed on table 44 of cutting element 28. For example, as illustrated in FIG. 2-7, peripherally extending chamfer 56, chamfer region 58, and a portion of peripheral surface 50 extending between second edge 62 and substrate 46 may be formed on table 44. According to some embodiments, peripherally extending chamfer 56 and/or chamfer region 58 may be formed on both table 44 and substrate 46. For example, as illustrated in FIG. 8, chamfer region 58 may extend from first edge 60 formed on table 44 to second edge 62 formed on substrate 46 of cutting element 28.

Figure 9:
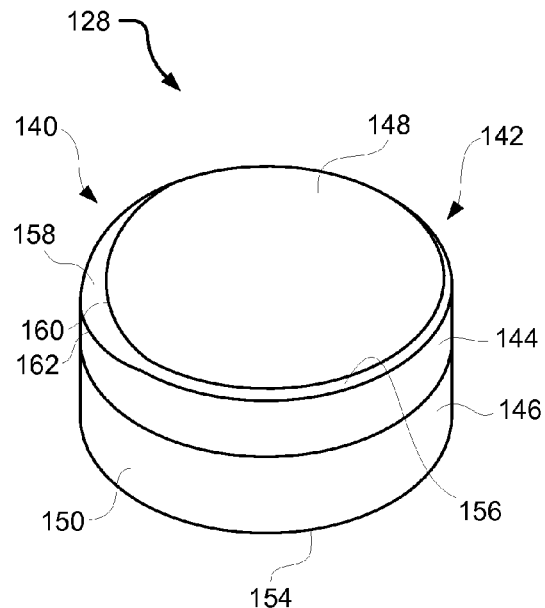
FIG. 9 is a perspective view of an exemplary cutting element according to at least one embodiment.
Figure 10:
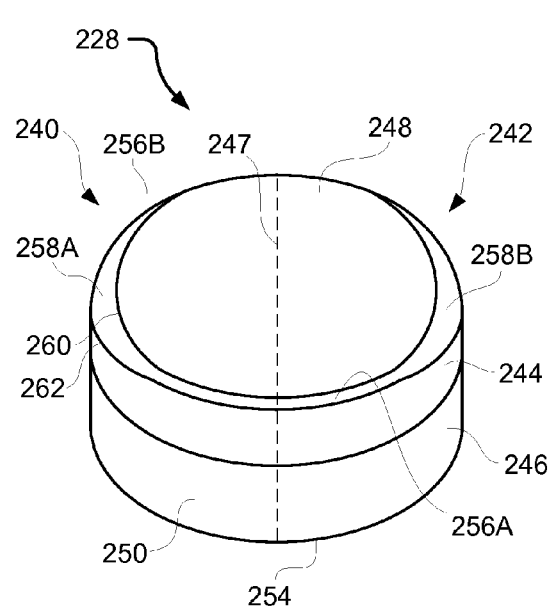
FIG. 10 is a perspective view of an exemplary cutting element according to at least one embodiment.
Figure 11:
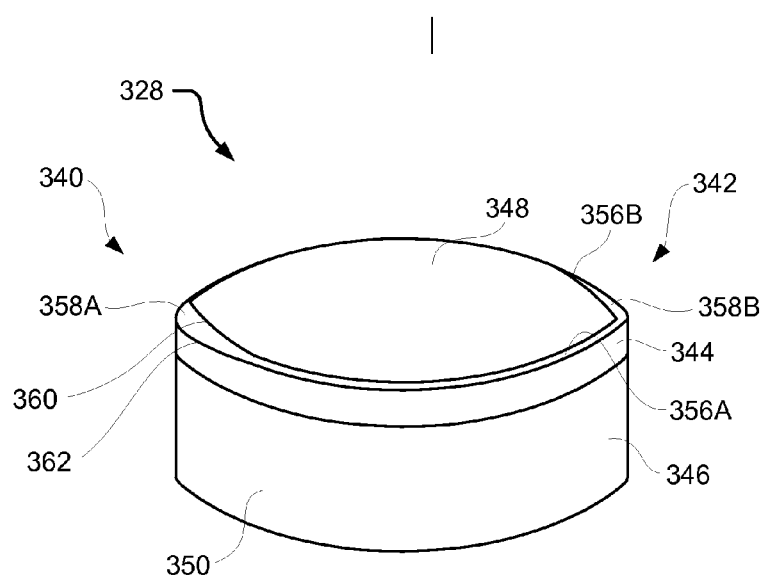
FIG. 11 is a perspective view of an exemplary cutting element according to at least one embodiment.

FIG. 9-11 illustrate various exemplary cutting elements that may be coupled to bit bodies of drill bits according to various embodiments. FIG. 9 is a perspective view of an exemplary cutting element 128 according to at least one embodiment. As shown in FIG. 9, cutting element 128 may comprise a table 144 affixed to or formed upon a substrate 146. Cutting element 128 may also comprise a cutting face 148 formed by table 144, a peripheral surface 150 formed by table 144 and substrate 146, and a back surface 154 formed by substrate 146. Cutting face 148 and peripheral surface 150 may be formed in any suitable shape, without limitation. In at least one embodiment, cutting face 148 may have a substantially arcuate periphery. In some embodiments, as illustrated in FIG. 9, peripheral surface 150 may comprise a substantially cylindrical surface. Cutting element 128 may include a forward portion 140 that is configured to extend from a bit body of a drill bit (e.g., bit body 222 of drill bit 220 illustrated in FIG. 12). Cutting element 128 may also include a rearward portion 142 located opposite forward portion 140.

Cutting element 128 may further comprise a peripherally extending chamfer 156 formed along at least a portion of a periphery of table 144 between cutting face 148 and peripheral surface 150. Additionally, cutting element 128 may comprise a chamfer region 158 located at forward portion 140 of the cutting element. Peripherally extending chamfer 156 may extend from chamfer region 158 toward rearward portion 142 of cutting element 128, as shown in FIG. 9. In some embodiments, cutting element 128 may comprise one or more cutting edges, such as portions of a first edge 160 and/or a second edge 162. First edge 160 and/or second edge 162 may define at least a portion of peripherally extending chamfer 156 and/or chamfer region 158.

FIG. 10 is a perspective view of an exemplary cutting element 228 according to some embodiments. As shown in FIG. 10, cutting element 228 may comprise a table 244 affixed to or formed upon a substrate 246. Cutting element 228 may also comprise a cutting face 248 formed by table 244, a peripheral surface 250 formed by table 244 and substrate 246, and a back surface 254 formed by substrate 246. Cutting face 248 and peripheral surface 250 may be formed in any suitable shape, without limitation. In at least one embodiment, cutting face 248 may have a substantially arcuate periphery. In some embodiments, as illustrated in FIG. 10, peripheral surface 250 may comprise a substantially cylindrical surface. Cutting element 228 may include a forward portion 240 that is configured to extend from a bit body of a drill bit (e.g., bit body 222 of drill bit 220 illustrated in FIG. 12). Cutting element 228 may also include a rearward portion 242 located opposite forward portion 240.

Cutting element 228 may comprise a first peripherally extending chamfer 256A and a second peripherally extending chamfer 256B formed along at least a portion of a periphery of table 244 between cutting face 248 and peripheral surface 250. Additionally, cutting element 228 may comprise a first chamfer region 258A located at forward portion 240 of cutting element 228 and a second chamfer region 258B located at rearward portion 242. In at least one embodiment, cutting element 228 may comprise a substantially symmetrical periphery about a plane extending through cutting element 228. For example, a border 247 may define a plane extending through cutting element 228. In at least one embodiment, the plane defined by border 247 may be substantially perpendicular to cutting face 248. As shown in FIG. 10, cutting element 228 may have a substantially symmetrical periphery about a plane defined by border 247. In at least one embodiment, first chamfer region 258A may comprise substantially the same shape as second chamfer region 258B and/or first peripherally extending chamfer 256A may comprise substantially the same shape as second peripherally extending chamfer 256B. In some embodiments, cutting element 228 may comprise one or more cutting edges, such as portions of a first edge 260 and/or a second edge 262. First edge 260 and/or second edge 262 may define at least a portion of first peripherally extending chamfer 256A, second peripherally extending chamfer 256B, first chamfer region 258A, and/or second chamfer region 258B.

According to at least one embodiment, cutting element 228 may be configured to be removed and repositioned when a portion of cutting element 228, such as forward portion 240, becomes worn and/or damaged from drilling. For example, cutting element 228 may be initially oriented on a bit body (e.g. bit body 222 illustrated in FIG. 12) so that so that first chamfer region 258A on forward portion 240 extends from the bit body in a forward direction 235. Accordingly, portions of first chamfer region 258A and first peripherally extending chamfer 256A may be exposed to a subterranean formation during drilling. Cutting element 228 may subsequently be removed and remounted to the bit body so that second chamfer region 258B and second peripherally extending chamfer 256B are exposed to a subterranean formation during subsequent drilling. For example, cutting element 228 may be removed and repositioned on the bit body when first chamfer region 258A and/or first peripherally extending chamfer 256A become worn and/or damaged. Following removal and repositioning of cutting element 228, the region of cutting element 228 that includes second chamfer region 258B becomes the forward portion (e.g., forward portion 240) of cutting element 228. Accordingly, cutting element 228 may continue to be used in drilling operations even after a portion of cutting element 228, such as first chamfer region 258A and/or first peripherally extending chamfer 256A, becomes worn and/or damaged.

FIG. 11 is a perspective view of an exemplary cutting element 328 according to some embodiments. As shown in FIG. 11, cutting element 328 may comprise a table 344 affixed to or formed upon a substrate 346. Cutting element 328 may also comprise a cutting face 348 formed by table 344, a peripheral surface 350 formed by table 344 and substrate 346, and a back surface 354 formed by substrate 346. Cutting face 348 and peripheral surface 350 may be formed in any suitable shape, without limitation. In at least one embodiment, cutting face 348 may have a substantially arcuate periphery. In some embodiments, peripheral surface 350 may comprise a partial-cylindrical surface. For example, as illustrated in FIG. 11, peripheral surface 350 may comprise two-partial cylindrical surfaces with arcuate portions extending between the partial-cylindrical surfaces. An example of a drill bit incorporating superabrasive cutting elements having a peripheral surface as illustrated in FIG. 11 may be found in U.S. Pat. No. 5,429,199, the disclosure of which is incorporated herein, in its entirety, by this reference. Cutting element 328 may include a forward portion 340 that is configured to extend from a bit body of a drill bit (e.g., bit body 322 of drill bit 320 illustrated in FIG. 13). Cutting element 328 may also include a rearward portion 342 located opposite forward portion 340.

Cutting element 328 may comprise a first peripherally extending chamfer 356A and a second peripherally extending chamfer 356B formed along at least a portion of a periphery of table 344 between cutting face 348 and peripheral surface 350. Additionally, cutting element 328 may comprise a first chamfer region 358A located at forward portion 340 of the cutting element and a second chamfer region 358B located at rearward portion 342. In at least one embodiment, first chamfer region 358A may comprise substantially the same shape as second chamfer region 358B and first peripherally extending chamfer 356A may comprise substantially the same shape as second peripherally extending chamfer 356B. In some embodiments, cutting element 328 may comprise one or more cutting edges, such as portions of a first edge 360 and/or a second edge 362. First edge 360 and/or second edge 362 may define at least a portion of first peripherally extending chamfer 356A, second peripherally extending chamfer 356B, first chamfer region 358A, and/or second chamfer region 358B.

According to at least one embodiment, cutting element 328 may be configured to be removed and repositioned when a portion of cutting element 328, such as forward portion 340, becomes worn and/or damaged from drilling. For example, cutting element 328 may be removed and repositioned on the bit body when first chamfer region 358A and/or first peripherally extending chamfer 356A become worn and/or damaged. Following removal and repositioning of cutting element 328, the region of cutting element 328 that includes second chamfer region 358B becomes the forward portion (e.g., forward portion 340) of cutting element 328. Accordingly, cutting element 328 may continue to be used in drilling operations even after a portion of cutting element 328, such as first chamfer region 358A and/or first peripherally extending chamfer 356A, becomes worn and/or damaged.

Figure 12:
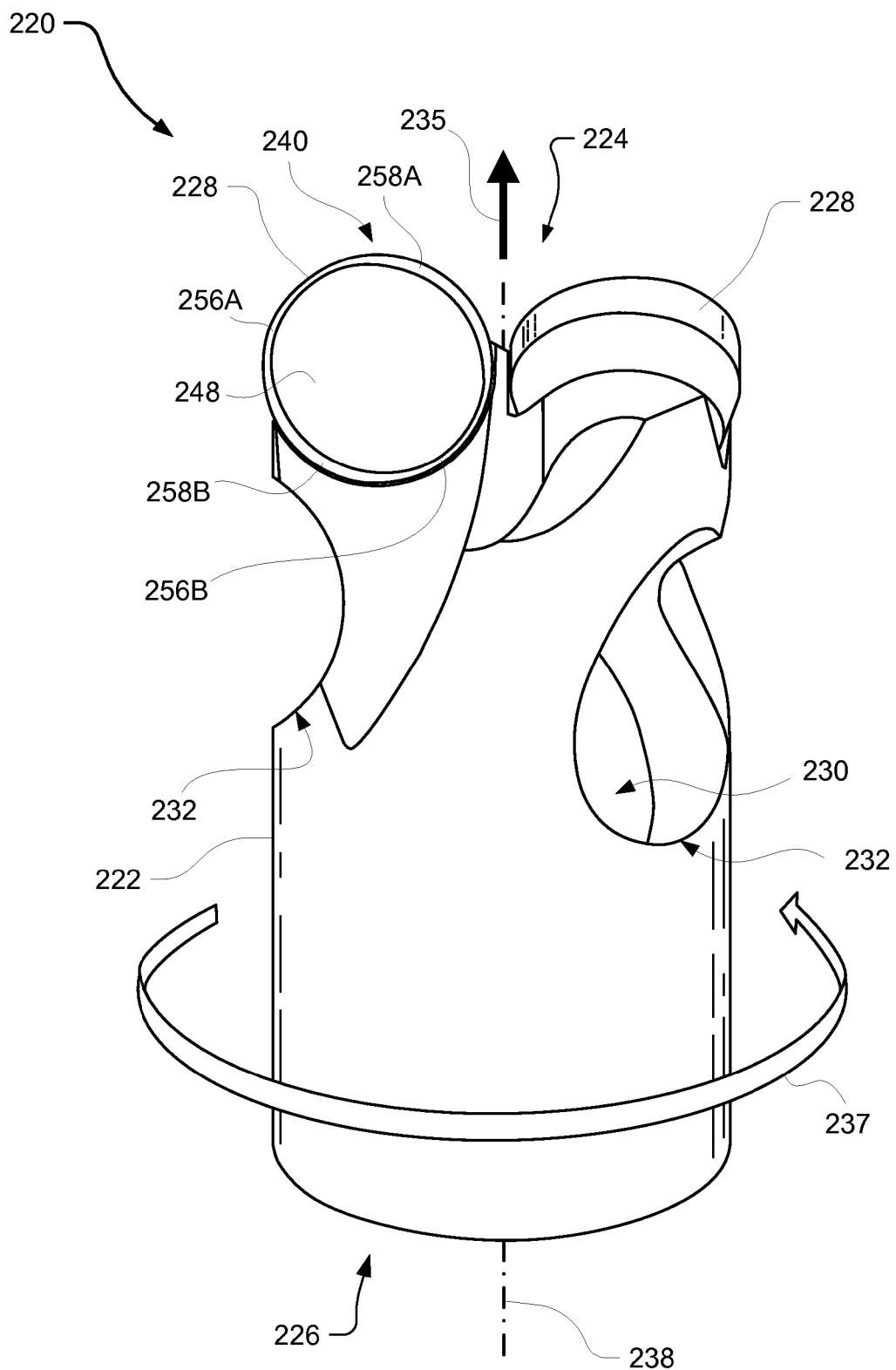
FIG. 12 is a perspective view of an exemplary drill bit that includes the cutting element illustrated in FIG. 10 according to at least one embodiment.
Figure 13:
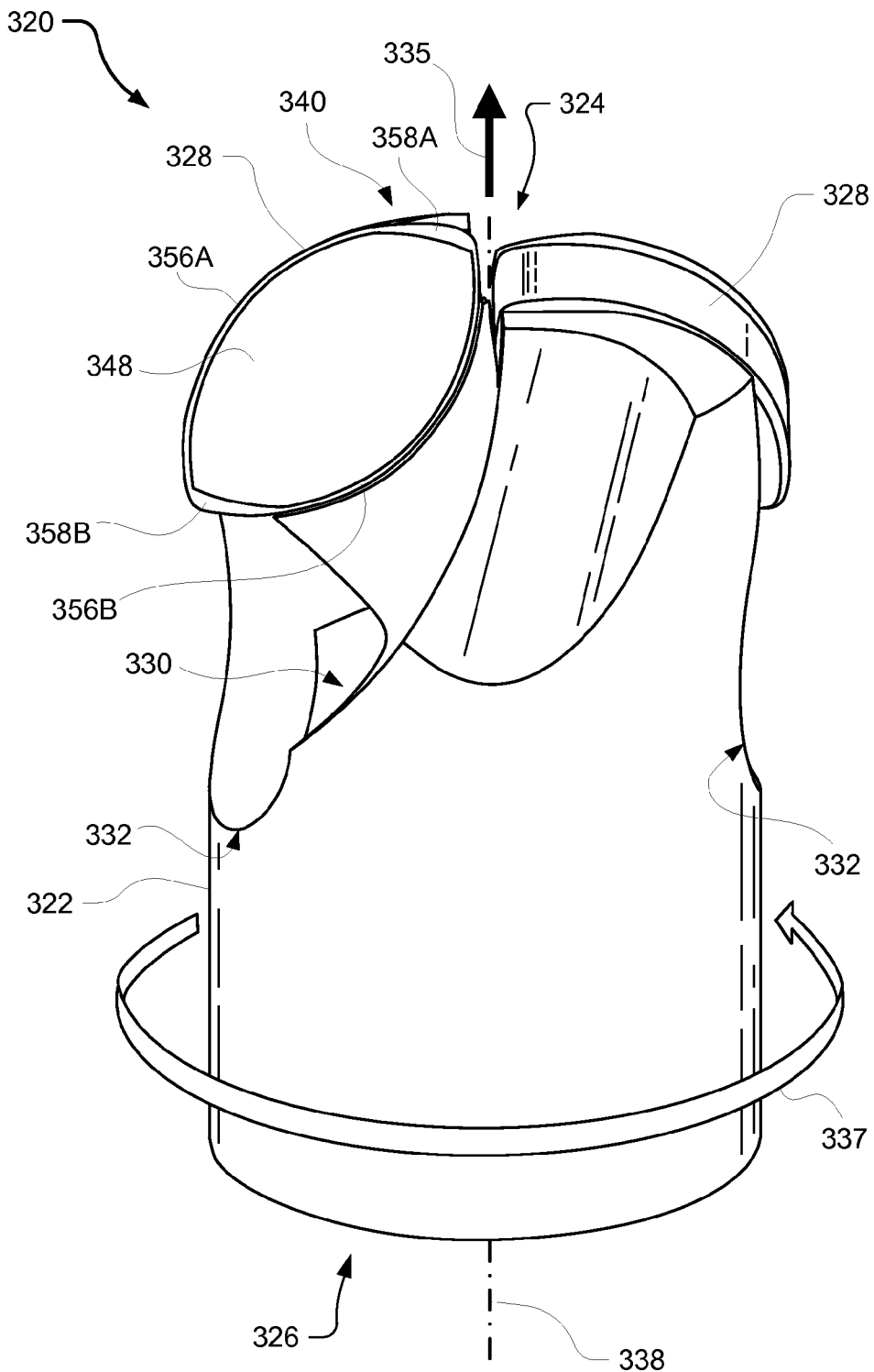
FIG. 13 is a perspective view of an exemplary drill bit that includes the cutting element illustrated in FIG. 11 according to at least one embodiment.

FIGS. 12 and 13 illustrate exemplary drill bits according to various embodiments. FIG. 12 is a perspective view of an exemplary drill bit 220 that includes the exemplary cutting element illustrated in FIG. 10. As shown in FIG. 12, drill bit 220 may comprise a bit body 222 having a forward end 224, a rearward end 226, and a rotational axis 238. At least one cutting element 228 may be coupled to bit body 222. For example, as shown in FIG. 12, a plurality of cutting elements 228 may be coupled to forward end 224 of bit body 222. In at least one embodiment, two cutting elements 228 may be positioned on bit body 222 circumferentially substantially 180° apart with substantially the same back rake angles and substantially the same side rake angles. In some embodiments, an internal passage 230 may be defined within bit body 222. Internal passage 230 may extend from a rearward opening defined in rearward end 226 of bit body 222 to at least one debris opening 232 defined in a side portion of bit body 222.

According to at least one embodiment, as shown in FIG. 12, a forward portion 240 of cutting element 228 may extend from bit body 222 in an axially forward direction 235 along rotational axis 238. For example, cutting element 228 may be oriented on bit body 222 so that first chamfer region 258A on forward portion 240 extends from bit body 222 in axially forward direction 235. Accordingly, portions of first chamfer region 258A and first peripherally extending chamfer 256A may be exposed to a subterranean formation during drilling as drill bit 220 is directed in forward direction 235 and rotated about rotational axis 238 in rotational direction 237. In at least one embodiment, cutting element 228 may be removed and remounted to bit body 222 such that second chamfer region 258B extends from bit body 222 in axially forward direction 235 and such that second chamfer region 258B and second peripherally extending chamfer 256B are exposed to a subterranean formation during subsequent drilling as drill bit 220 is directed in forward direction 235 and rotated about rotational axis 238 in rotational direction 237.

FIG. 13 is a perspective view of an exemplary drill bit 320 that includes the exemplary cutting element illustrated in FIG. 11. As shown in FIG. 13, drill bit 320 may comprise a bit body 322 having a forward end 324, a rearward end 326, and a rotational axis 338. At least one cutting element 328 may be coupled to bit body 322. For example, as shown in FIG. 13, a plurality of cutting elements 328 may be coupled to forward end 324 of bit body 322. In at least one embodiment, two cutting elements 328 may be positioned on bit body 322 circumferentially substantially 180° apart with substantially the same back rake angles and substantially the same side rake angles. In some embodiments, an internal passage 330 may be defined within bit body 322. Internal passage 330 may extend from a rearward opening defined in rearward end 326 of bit body 322 to at least one debris opening 332 defined in a side portion of bit body 322.

As shown in FIG. 13, according to at least one embodiment, a forward portion 340 of cutting element 328 may extend from bit body 322 in an axially forward direction 335 along rotational axis 338. For example, cutting element 328 may be oriented on bit body 322 so that first chamfer region 358A on forward portion 340 extends from bit body 322 in axially forward direction 335. Accordingly, portions of first chamfer region 358A and first peripherally extending chamfer 356A may be exposed to a subterranean formation during drilling as drill bit 320 is directed in forward direction 335 and rotated about rotational axis 338 in rotational direction 337. In at least one embodiment, cutting element 328 may be removed and remounted to bit body 322 such that second chamfer region 358B extends from bit body 322 in axially forward direction 335 and such that second chamfer region 358B and second peripherally extending chamfer 356B are exposed to a subterranean formation during subsequent drilling as drill bit 320 is directed in forward direction 335 and rotated about rotational axis 338 in rotational direction 337.

Figure 14:
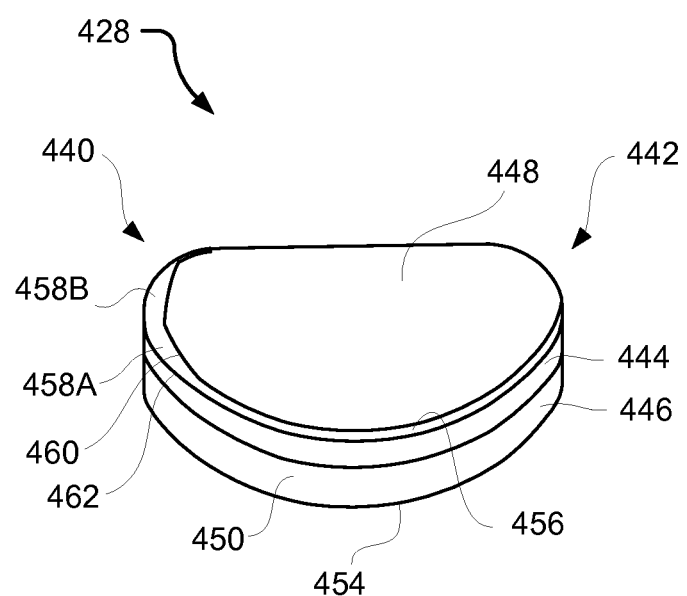
FIG. 14 is a perspective view of an exemplary cutting element according to at least one embodiment.

FIG. 14 is a perspective view of an exemplary cutting element 428 according to at least one embodiment. As shown in FIG. 14, cutting element 428 may comprise a table 444 affixed to or formed upon a substrate 446. Cutting element 428 may also comprise a cutting face 448 formed by table 444, a peripheral surface 450 formed by table 444 and substrate 446, and a back surface 454 formed by substrate 446. Cutting face 448 and peripheral surface 450 may be formed in any suitable shape, without limitation. In at least one embodiment, cutting face 448 may have a substantially arcuate periphery. Cutting element 428 may include a forward portion 440 that is configured to extend from a bit body of a drill bit (e.g., bit body 22 of drill bit 20 illustrated in FIG. 1). Cutting element 428 may also include a rearward portion 442 located opposite forward portion 440.

Cutting element 428 may further comprise a peripherally extending chamfer 456 formed along at least a portion of a periphery of table 444 between cutting face 448 and peripheral surface 450. Additionally, cutting element 428 may comprise a plurality of chamfer regions located at forward portion 440 of the cutting element. For example, cutting element 428 may comprise a first chamfer region 458A and a second chamfer region 458B disposed at forward portion 440. Peripherally extending chamfer 456 may extend from first chamfer region 458A toward rearward portion 442 of cutting element 428, as shown in FIG. 14. Additionally, first chamfer region 458A may extend from second chamfer region 458B toward peripherally extending chamfer 456. In some embodiments, first chamfer region 458A and second chamfer region 458B may have varying widths.

In one embodiment, first chamfer region 458A and second chamfer region 458B may exhibit average widths that exceed an average width of peripherally extending chamfer 456. For example, second chamfer region 458B may include a width that is greater than a maximum width of first chamfer region 458A. In another embodiment, first chamfer region 458A may exhibit substantially the same average width as second chamfer region 458B. In at least one embodiment, cutting element 428 may comprise one or more cutting edges, such as portions of a first edge 460 and/or a second edge 462. First edge 460 and/or second edge 462 may define at least a portion of peripherally extending chamfer 456, first chamfer region 458A, and/or second chamfer region 458B.

Figure 15:
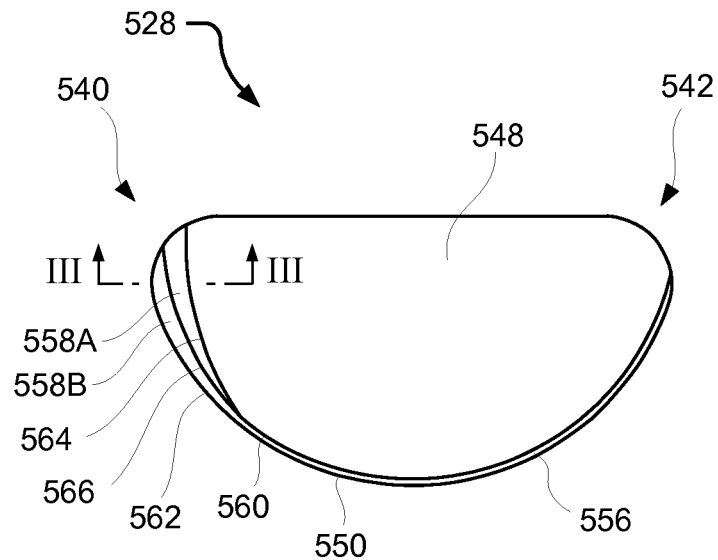
FIG. 15 is a top view of an exemplary cutting element according to at least one embodiment.
Figure 16:
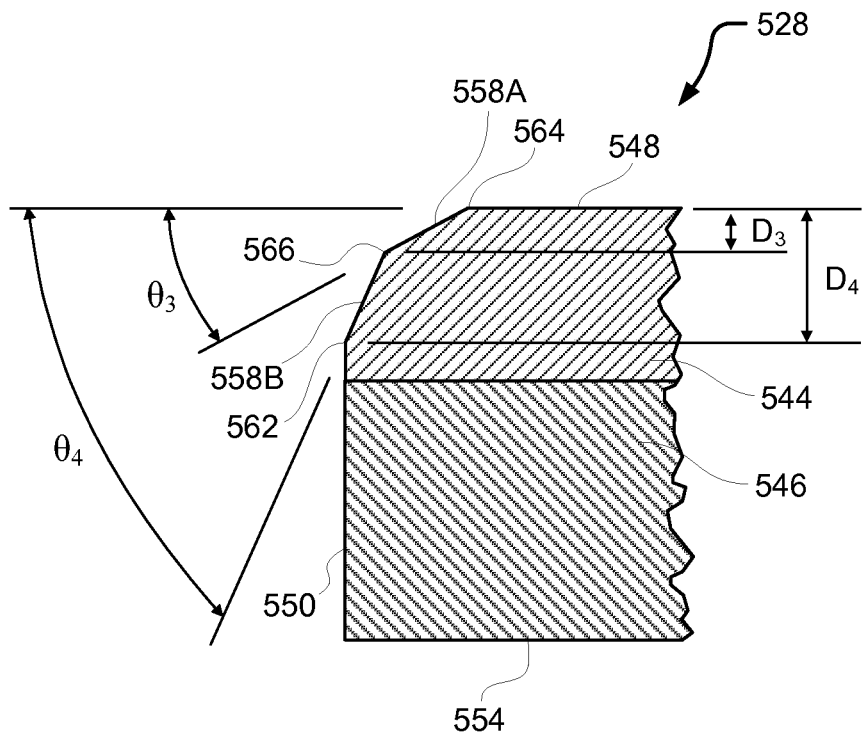
FIG. 16 is a partial cross-sectional view of the exemplary cutting element illustrated in FIG. 15.

FIGS. 15 and 16 show an exemplary cutting element 528 according to at least one embodiment. FIG. 16 is a partial cross-sectional view of a portion of cutting element 528 taken along line III-III shown in FIG. 15. As shown in FIGS. 15 and 16, cutting element 528 may comprise a table 544 affixed to or formed upon a substrate 546. Cutting element 528 may also comprise a cutting face 548 formed by table 544, a peripheral surface 550 formed by table 544 and substrate 546, and a back surface 554 formed by substrate 546. Cutting face 548 and peripheral surface 550 may be formed in any suitable shape, without limitation. In at least one embodiment, cutting face 548 may have a substantially arcuate periphery. Cutting element 528 may include a forward portion 540 that is configured to extend from a bit body of a drill bit (e.g., bit body 22 of drill bit 20 illustrated in FIG. 1). Cutting element 528 may also include a rearward portion 542 located opposite forward portion 540.

Cutting element 528 may further comprise a peripherally extending chamfer 556 formed along at least a portion of a periphery of table 544 between cutting face 548 and peripheral surface 550. Additionally, cutting element 528 may comprise at least one chamfer region located at forward portion 540 of the cutting element. For example, cutting element 528 may comprise a first chamfer region 558A and a second chamfer region 558B disposed at forward portion 540. Peripherally extending chamfer 556 may extend from first chamfer region 558A and/or second chamfer region 558B toward rearward portion 542 of cutting element 528, as shown in FIG. 15. In some embodiments, first chamfer region 558A and second chamfer region 558B may have varying widths. As illustrated in FIGS. 15 and 16, first chamfer region 558A may be located adjacent cutting face 548 and second chamfer region 558B may be located adjacent peripheral surface 550. According to at least one embodiment, first chamfer region 558A may extend from cutting face 548 to second chamfer region 558B, and second chamfer region 558B may extend from first chamfer region 558A to peripheral surface 550.

In at least one embodiment, cutting element 528 may comprise one or more cutting edges, such as portions of a first edge 560, a second edge 562, a third edge 564, and/or a fourth edge 566. First edge 560, second edge 562, third edge 564, and/or fourth edge 566 may define at least a portion of peripherally extending chamfer 556, first chamfer region 558A, and/or second chamfer region 558B. For example, first edge 560 and second edge 562 may define at least a portion of peripherally extending chamfer 556. According to various embodiments, third edge 564 and fourth edge 566 may define at least a portion of first chamfer region 558A, as shown in FIGS. 15 and 16. Additionally, second edge 562 and fourth edge 566 may define at least a portion of second chamfer region 558B.

First chamfer region 558A and second chamfer region 558B may be formed to different geometries using any suitable technique. For example, the depths and/or angles of first chamfer region 558A and/or second chamfer region 558B may be selected so as to obtain a desired geometry. In at least one example, as illustrated in FIG. 16, a depth $D_3$ of a portion of first chamfer region 558A and/or a depth $D_4$ of a portion of second chamfer region 558B with respect to cutting face 548 may be selected so as to obtain a desired width and angle for first chamfer region 558A and second chamfer region 558B. For example, as shown in FIG. 16, first chamfer region 558A may be formed so that a portion of fourth edge 566 is located at a depth $D_3$ with respect to cutting face 548 and second chamfer region 558B may be formed so that a portion of second edge 562 is located at a depth $D_4$ with respect to cutting face 548, with depth $D_4$ being greater than depth $D_3$.

The angles, $\theta_3$ and $\theta_4$, of first chamfer region 558A and second chamfer region 558B with respect to cutting face 548 and/or peripheral surface 550 may be selected so as to obtain desired widths for first chamfer region 558A and second chamfer region 558B. According to some embodiments, the angles of first chamfer region 558A and second chamfer region 558B with respect to cutting face 548 and/or peripheral surface 550 may be different. For example, a portion of first chamfer region 558A may be formed at an angle $\theta_3$ with respect to cutting face 548 and a portion of second chamfer region 558B may be formed at an angle $\theta_4$ with respect to cutting face 548, the angle $\theta_4$ being greater than the angle $\theta_3$. More generally, angles $\theta_3$ and $\theta_4$, as well as depths $D_3$ and $D_4$ may be selected as desired.

First chamfer region 558A and/or second chamfer region 558B may exhibit average widths that individually exceed an average width of peripherally extending chamfer 556. In some embodiments, first chamfer region 558A and/or second chamfer region 558B may exhibit average widths that are individually less than an average width of peripherally extending chamfer 556 and a combined average width that exceeds an average width of peripherally extending chamfer 556. First chamfer region 558A may exhibit substantially the same average width or a different average width than second chamfer region 558B.

Figure 17:
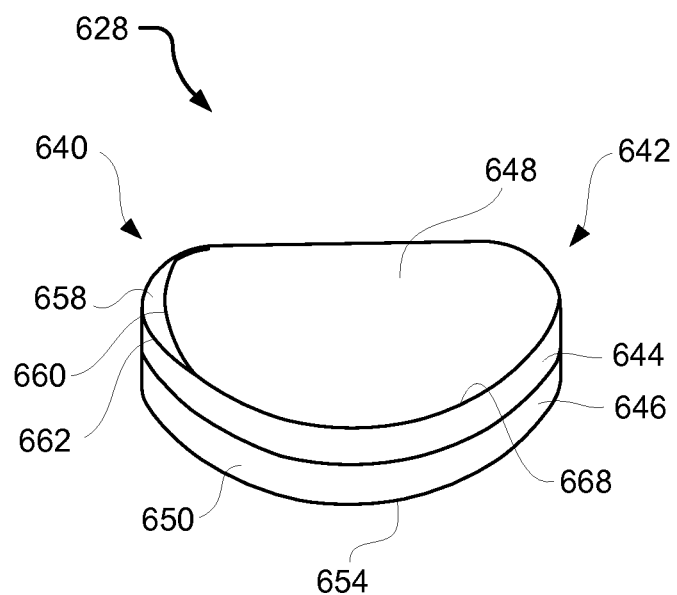
FIG. 17 is a perspective view of an exemplary cutting element according to at least one embodiment.

FIG. 17 is a perspective view of an exemplary cutting element 628 according to at least one embodiment. As shown in FIG. 17, cutting element 628 may comprise a table 644 affixed to or formed upon a substrate 646. Cutting element 628 may also comprise a cutting face 648 formed by table 644, a peripheral surface 650 formed by table 644 and substrate 646, and a back surface 654 formed by substrate 646. Cutting face 648 and peripheral surface 650 may be formed in any suitable shape, without limitation. In at least one embodiment, cutting face 648 may have a substantially arcuate periphery. Cutting element 628 may include a forward portion 640 that is configured to extend from a bit body of a drill bit (e.g., bit body 22 of drill bit 20 illustrated in FIG. 1). Cutting element 628 may also include a rearward portion 642 located opposite forward portion 640.

Cutting element 628 may further comprise a peripherally extending edge 668 formed along at least a portion of a periphery of table 644 between cutting face 648 and peripheral surface 650. Additionally, cutting element 628 may comprise a chamfer region 658 located at forward portion 640 of the cutting element. Peripherally extending edge 668 may extend from chamfer region 658 toward rearward portion 642 of cutting element 628, as shown in FIG. 17. In at least one embodiment, cutting element 628 may comprise one or more cutting edges, such as a portion of a first edge 660, a portion of a second edge 662, and/or a portion of peripherally extending edge 668. First edge 660 and/or second edge 662 may define at least a portion of chamfer region 658.

The preceding description has been provided to enable others skilled the art to best utilize various aspects of the exemplary embodiments described herein. This exemplary description is not intended to be exhaustive or to be limited to any precise form disclosed. Many modifications and variations are possible without departing from the spirit and scope of the instant disclosure. It is desired that the embodiments described herein be considered in all respects illustrative and not restrictive and that reference be made to the appended claims and their equivalents for determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A cutting element for a roof-bolt drill bit, the cutting element comprising:
    a substrate;
    a superabrasive table bonded to the substrate, the superabrasive table comprising:
        a cutting face;
        a non-cylindrical peripheral surface extending around an outer periphery of the cutting face;
        at least one chamfer region;
        a peripherally extending chamfer extending from the at least one chamfer region along the outer periphery of the cutting face;
    wherein:
        a width of the at least one chamfer region is greater than a width of the peripherally extending chamfer;
        the at least one chamfer region and the peripherally extending chamfer do not extend to the substrate.

2. The cutting element of claim 1, wherein the width of the at least one chamfer region is greater than twice the width of the peripherally extending chamfer.

3. The cutting element of claim 1, wherein:
    the at least one chamfer region and the peripherally extending chamfer are defined between a first edge adjacent the cutting face and a second edge adjacent the peripheral surface of the superabrasive table;
    a width of the at least one chamfer region between the first edge and the second edge is greater than a width of the peripherally extending chamfer between the first edge and the second edge.

4. The cutting element of claim 3, wherein the peripherally extending chamfer exhibits a greater angle relative to the cutting face than the at least one chamfer region.

5. The cutting element of claim 3, wherein the at least one chamfer region exhibits a greater depth than the peripherally extending chamfer.

6. The cutting element of claim 1, wherein the superabrasive table comprises polycrystalline diamond.

7. The cutting element of claim 1, wherein the peripheral surface comprises an arcuate surface.

8. The cutting element of claim 7, wherein at least a portion of the peripheral surface comprises a partial-cylindrical surface.

9. The cutting element of claim 1, wherein the at least one chamfer region comprises a first chamfer region and a second chamfer region on a portion of the cutting element opposite the first chamfer region, the peripherally extending chamfer extending from the first chamfer region to the second chamfer region.

10. The cutting element of claim 9, wherein:
    the cutting element comprises a substantially symmetrical periphery about a plane extending through the cutting element;
    the first chamfer region comprises substantially the same shape as the second chamfer region.

11. The cutting element of claim 1, further comprising a plurality of chamfer regions, the plurality of chamfer regions including the at least one chamfer region.

12. The cutting element of claim 1, wherein the substrate comprises a different material than the superabrasive table.

13. The cutting element of claim 1, wherein the substrate comprises a carbide substrate.

14. A roof-bolt drill bit, comprising:
    a bit body comprising:
        a forward end;
        a rearward end;
        a rotational axis extending between the forward end and the rearward end, the bit body being rotatable about the rotational axis;
    at least one cutting element mounted to the bit body, the at least one cutting element comprising:
        a substrate;
        a superabrasive table bonded to the substrate, the superabrasive table comprising:
            a cutting face;
            a peripheral surface extending around an outer periphery of the cutting face;

at least one chamfer region;
a peripherally extending chamfer extending from the at least one chamfer region along the outer periphery of the cutting face, a width of the at least one chamfer region being greater than a width of the peripherally extending chamfer;
wherein the at least one chamfer region and the peripherally extending chamfer do not extend to the substrate.

15. The drill bit of claim 14, wherein the periphery of the cutting element is non-cylindrical.

16. The drill bit of claim 14, wherein at least a portion of the periphery of the cutting element is substantially cylindrical.

17. The drill bit of claim 14, wherein the at least one cutting element comprises two cutting elements positioned circumferentially substantially 180° apart with substantially the same back rake angles and side rake angles.

18. The drill bit of claim 14, wherein the at least one cutting element is positioned with a back rake angle of between approximately 5° and approximately 45° and a side rake angle of between approximately 0° and approximately 20°.

19. The drill bit of claim 14, wherein the at least one cutting element forms a cutting tip extending from the forward end of the bit body, the at least one chamfer region being located at the cutting tip.

20. A roof-bolt drilling apparatus, comprising:
a drill steel;
a drill bit mounted to the drill steel, the drill bit comprising:
    a bit body comprising:
        a rearward end adjacent the drill steel;
        a forward end opposite the rearward end;
        a rotational axis extending between the forward end and the rearward end, the bit body being rotatable about the rotational axis;
    at least one cutting element mounted to the bit body, the at least one cutting element comprising:
        a substrate;
        a superabrasive table bonded to the substrate, the superabrasive table comprising:
            a cutting face;
            a peripheral surface extending around an outer periphery of the cutting face;
            at least one chamfer region;
            a peripherally extending chamfer extending from the at least one chamfer region along the outer periphery of the cutting face, a width of the at least one chamfer region being greater than a width of the peripherally extending chamfer;
wherein the at least one chamfer region and the peripherally extending chamfer do not extend to the substrate.

* * * * *